United States Patent [19]

Malinowski et al.

[11] 4,169,523
[45] Oct. 2, 1979

[54] DISC BRAKE

[75] Inventors: Eugene F. Malinowski, Milford; Casimir Klimkowski, Warren, both of Mich.

[73] Assignee: D.A.B. Industries, Inc., Troy, Mich.

[21] Appl. No.: 871,191

[22] Filed: Jan. 23, 1978

[51] Int. Cl.² .............................................. F16D 55/06
[52] U.S. Cl. ................................ 188/71.4; 188/71.5; 188/106 F; 192/70; 192/83
[58] Field of Search .................... 188/71.1, 71.3, 71.4, 188/71.5, 72.1, 72.6, 72.7, 106 F; 192/70, 83, 93 A

[56] References Cited

U.S. PATENT DOCUMENTS

| | | | |
|---|---|---|---|
| 2,016,359 | 10/1935 | Corbin | 188/71.5 |
| 2,679,769 | 6/1954 | Parrett | 192/93 A |
| 3,734,242 | 5/1973 | Klaue | 188/71.4 |
| 4,036,328 | 7/1977 | Hoffman et al. | 192/93 A |
| 4,039,051 | 8/1977 | Otto | 188/72.1 |

FOREIGN PATENT DOCUMENTS 2324037 11/1973 Fed. Rep. of Germany .......... 188/71.4

Primary Examiner—Edward R. Kazenske
Attorney, Agent, or Firm—Whittemore, Hulbert & Belknap

[57] ABSTRACT

The disc brake comprises a stack of reaction discs interspersed between a stack of friction discs all mounted within a housing. Brake actuation is provided by either hydraulically or manually rotating an actuating plate which, through a roller/ramp structure, moves a piston structure, causing braking engagement of the reaction discs and friction discs.

4 Claims, 4 Drawing Figures

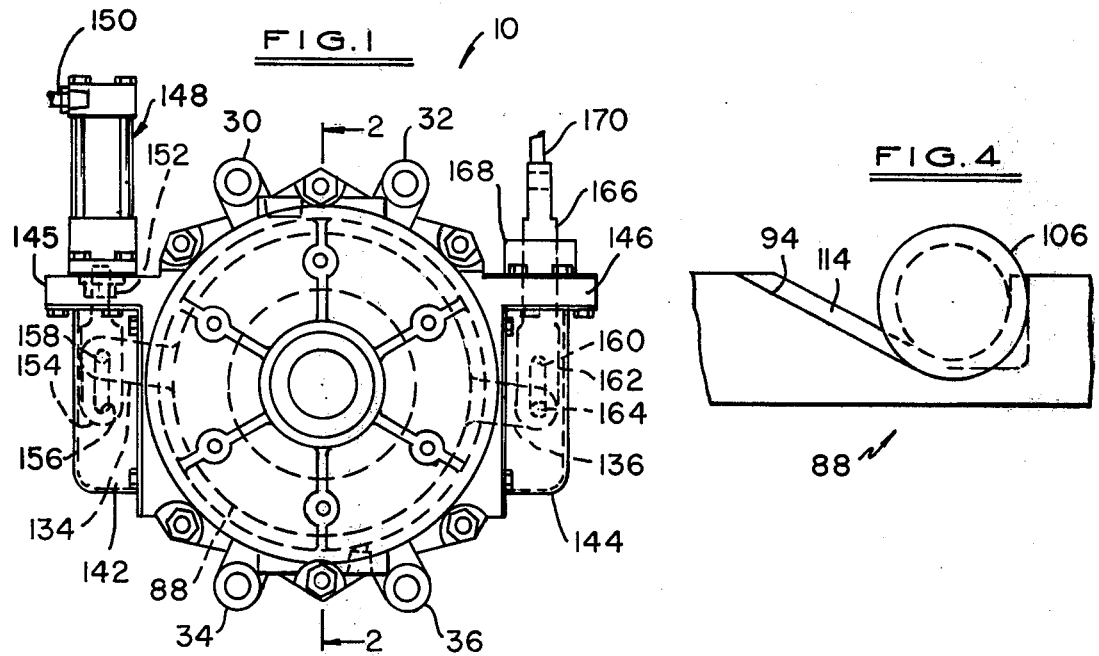
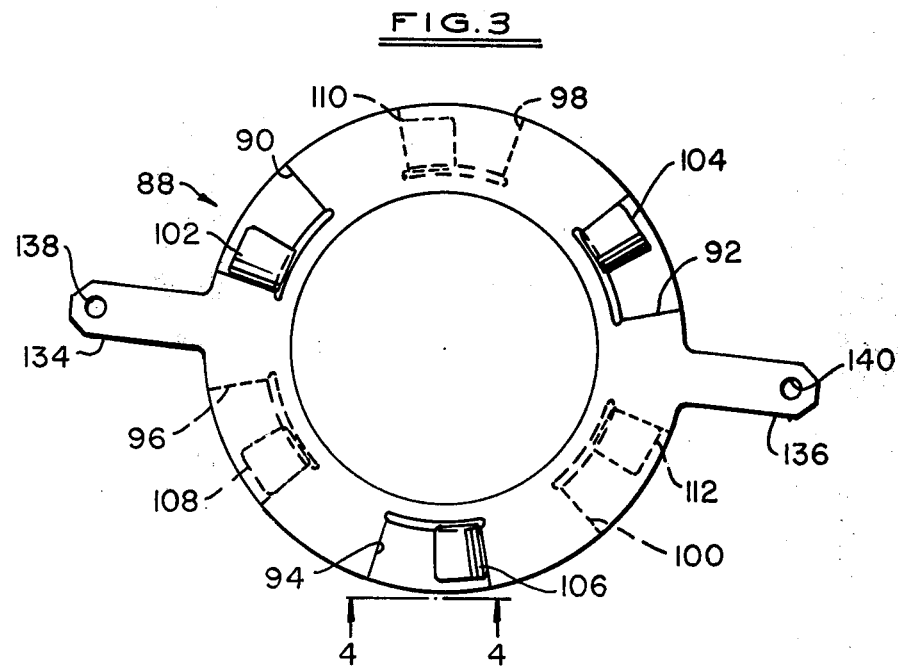

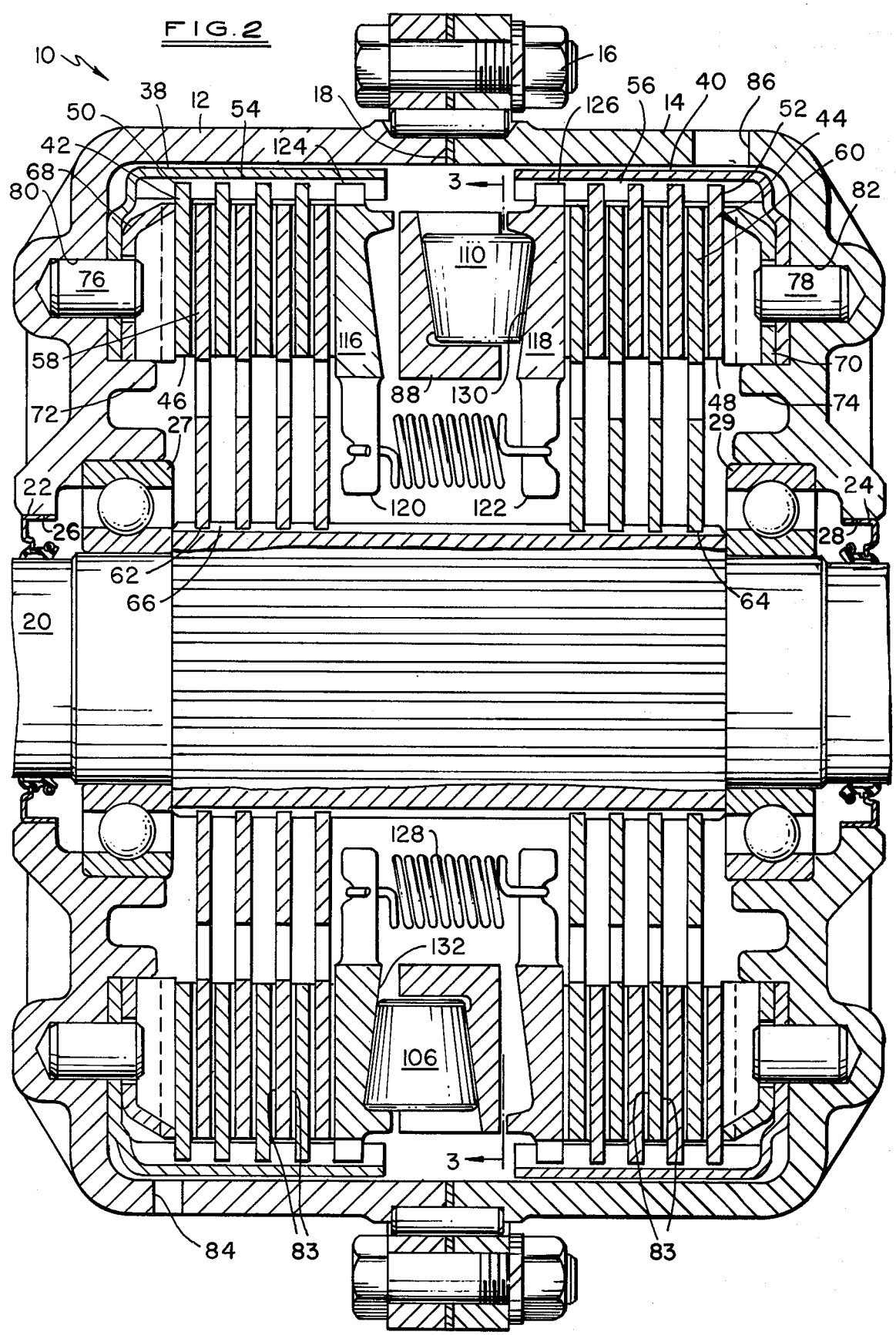

DISC BRAKE

BACKGROUND OF THE INVENTION

In recent years, disc-type brakes for vehicles have increasingly supplanted the previously conventional drum-type vehicle brakes.

In accordance with the present invention, a disc brake is provided which incorporates the functions, into one brake, of both the normal service brake, that is, the hydraulically actuated brake used to stop a vehicle, and a manual system, either for emergency or parking brake functions. The service brake is hydraulically actuated from a conventional automotive master cylinder plumbed to an hydraulic cylinder incorporated in the brake. The brake can also be actuated manually, independently of the hydraulic system, by lever or pedal structure remotely attached on the brake. This manual structure may be either for emergency situations or for parking.

Brake actuation is provided by hydraulically or manually rotating a central plate which, through a roller/ramp structure, moves a piston structure to engage both halves of the brake simultaneously, the brake incorporating two separate stacks of brake discs. The roller/ramp structure attenuates the hydraulic or manual force required to actuate the brake and, in effect, makes the brake operate as a self-contained power brake which may eliminate the need for a vacuum or power assist at the master cylinder. The pistons, rollers and central plate are held together by springs which return the pistons to a neutral position when hydraulic pressure or manual force is released. A roller/ramp structure is incorporated rather than a ball/ramp structure. This results in greatly reducing component stresses and simplifying machining.

SUMMARY OF THE INVENTION

A disc brake for a rotating member is provided. The brake includes a housing and means for journalling same on the rotating member. At least one first brake disc, including means for non-rotatably but axially slidably mounting same on said rotating member, is provided. At least one second brake disc is provided. This disc is non-rotatably but axially slidably mounted within the housing adjacent the first brake disc. One of the brake discs has friction material adhered thereto in contactable relationship to the other brake disc. An actuating plate is rotatably mounted within the housing. A ramp structure is provided on the actuating plate angled towards said brake discs. Roller means are provided on the ramp structure rollable thereon in contactable relationship with one of the discs. Means are provided to rotate the actuating plate to cause the roller means to roll on the ramp structure into contact with one brake disc for shifting the disc axially into braking engagement with the other disc. The means to rotate said actuating plate comprises an hydraulic structure and a manually operable mechanical structure. Each of such structures is actuatable independently of the other.

In the drawings:

FIG. 1 is an end elevational view of one embodiment of the brake structure of the present invention;

FIG. 2 is a sectional view of the brake of FIG. 1 taken substantially along the line 2—2, looking in the direction of the arrows;

FIG. 3 is a plan view of the brake actuating plate shown with associated tapered rollers; and FIG. 4 is a view in the direction of the arrows of FIG. 3 illustrating a tapered roller and actuating plate recess structure.

Referring to FIGS. 1 and 2, the brake 10 includes cup-shaped housing members 12, 14 secured together by means of peripherally spaced nut and bolt structures 16. An annular seal element 18 is provided to make the housing fluid tight. The brake 10 is adapted primarily for use in connection with vehicles. Means are provided for passing oil through the brake housing to act as a coolant and as a means for improving the braking function. For this reason, the housing must be fluid tight.

The brake 10 is received on a shaft 20 which mounts vehicle wheels. Seals 22, 24 are provided in housing openings 26, 28. Bearing structures 27, 29 are provided to journal the brake housing on shaft 20.

As will be noted in FIG. 1, four projections 30, 32, 34, 36 having openings therethrough are provided for securing the brake housing to fixed structure of a vehicle upon which the brake is utilized.

A pair of cup-shaped retaining members 38, 40 are provided interiorly of the brake housing. A plurality of reaction discs 42, 44 are received on each of the retaining members. The reaction discs are bare metal plates. These discs are referred to as reaction discs even though, as in the present case, they are used to apply braking pressure. These discs may be functionally reversed so as to receive braking pressure. The reaction discs are ring-like members having relatively large central openings 46, 48. The discs have spaced apart peripheral lugs 50, 52 which are received in longitudinal slots 54, 56 provided in the cup-like retaining members 38, 40. Thus, the reaction discs remain stationary along with the brake housing.

The two stacks of brake discs are composed of alternate reaction discs 50, 52 and friction discs 58, 60. Each friction disc 58, 60 has a central opening 62, 64 therethrough, the periphery of which is serrated. The shaft 20 has mating peripheral serrated portions 66 over which the discs 58, 60 are received for driving engagement with the shaft with freedom to move axially. Cup-shaped spacer members 68, 70 limit the axial movement of the plates in the outward direction. The retaining members and the spacer members are mounted on internal annular flanges 72, 74 and held in place by peripherally spaced apart pins 76, 78. The pins are press fitted into peripherally spaced openings 80, 82.

Each friction disc has adhered on each face thereof a ring of friction material 83. The friction material is conventionally fabricated of a paper-like substance which has conventionally been asbestos based. However, other friction materials may be used in conjunction with the present invention. The frictional nature of the material results in the friction discs frictionally engaging the reaction discs upon compression of the stacks of discs, with the result that braking action will occur to stop rotation of the shaft 20.

An opening 84 is provided in the lower portion of the brake housing and an opening 86 of substantially larger diameter is provided in the upper portion of the brake housing. These openings are adapted to receive conduits for the flow of oil through the brake housing. Oil is injected into opening 84 and is extracted through opening 86. As before mentioned, the provision of oil in the brake housing has a cooling effect and also improves overall functioning of the brake. The friction discs may be provided with peripheral slots to act as scoops to carry oil from the lower portion of the brake housing to the upper portion. The cooling oil requirements are minimal, typically about 1.5 g.p.m. for most applications, and may be provided by any external source.

Referring to FIGS. 2, 3 and 4, it will be noted that an annular actuating plate 88 is provided in the brake housing between the two stacks of brake discs. The plate 88 is provided on each side with three recesses 90, 92, 94 and 96, 98, 100. The recesses on one side are alternate with recesses on the other side. A tapered roller 102, 104, 106, 108, 110, 112 is provided in each recess.

As will be noted in FIG. 4, each recess defines an inclined ramp 114 the surface of which mates with the taper of the roller. The rollers may thus be rolled from their normal positions on the lower part of the ramp to an upper position on the ramp. When moved to an upper position, the periphery of each roller is positioned further axially outwardly from the actuating plate 88. As viewed in FIG. 2, the rollers on the left are moved so that portions thereof extend further axially left while the rollers on the right are moved to positions wherein the peripheries thereof extend further axially to the right. It is this movement which provides the force to cause compression of the stacks of brake discs.

An annular piston 116, 118 is provided on each side of the actuating plate 88. Each piston 116, 118 has a central opening 120, 122 to clear the shaft 20. Peripheral lugs 124, 126 are provided on these pistons for reception in the slots 54, 56. The pistons 116, 118 are connected together by a plurality of peripherally spaced apart coil springs 128. The springs 128 constantly bias the pistons 116, 118 towards the actuating plate 88. Another roller surfaces 130, 132 are provided on the pistons 116, 118. These surfaces match the tapered portion of the ramp surfaces on the actuating plate which receive the tapered rollers but are not inclined so as to cause the rollers to move axially. The rollers thus ride in a type of slot defined by the plate and pistons. As will be appreciated, when the rollers ride up the ramp surfaces on the actuating plate 88, they exert pressure against the pistons 116, 118, causing the pistons to remove axially outwardly to compress the two stacks of reaction and friction discs, thereby resulting in the desired braking action.

The actuating plate 88 has radially outwardly diametrically opposed projections 134, 136 on the periphery thereof. Each of these projections has an opening 138, 140. The projections 134, 136 extend out of openings in the brake housing into auxiliary housings 142, 144. The auxiliary housings 142, 144 are secured to the main brake housing and outwardly extending flanges 145, 146 by means of screws. Suitable sealing means are provided so that the auxiliary housings 142, 144 provide fluid tight extensions of the brake housing.

A hydraulic cylinder 148 is mounted on the upper surface of flange 145. Hydraulic fluid under pressure is injectable into the hydraulic cylinder 148 via a conduit 150 which is adapted to be connected to the master cylinder of the brake system in the vehicle. By depressing the vehicle brake pedal, hydraulic fluid under pressure is transmitted to the cylinder. The cylinder has a piston 152 slidable therein which is extended outwardly when the fluid pressure increases. A clevis 154 having an elongated opening 156 is secured to the piston 152. A pin 158 extends through the opening 138 into the opening 156 to thereby provide a mechanical connection between the clevis and the projection.

Normally, the plate 88 in positioned, as shown in FIG. 1, with the pin 158 in the uppermost position in contact with the upper edge of the opening 156. Downward movement of the piston 152 is therefore effective to cause pivoting of the plate 88 in the counterclockwise direction, as viewed in FIG. 1. Such movement of the plate 88 causes the tapered rollers to roll up their ramps and apply pressure to pistons 116, 118, thus resulting in the braking action. When the pressure in cylinder 148 is relieved upon release of the brake pedal, the springs 128 bias the pistons back with the result that the rollers move downwardly on their respective ramps, causing the plate 88 to return to the piston illustrated in FIG. 1.

The opposing projection 136 on plate 88 engages a clevis 162 having an elongated opening 160 by means of pin 164 in the manner previously described. The pin 164 normally engages the bottom end of opening 160 with the result that upward movment of the clevis 162 will result in counterclockwise pivoting of plate 88 with the resulting braking action previously described. The clevis 162 is secured to slidable member 166 which is slidably received in guide structure 168. The guide structure 168 is screwed onto the upper surface of flange 146. A rod 170 is secured to the upper end of slidable member 166. The other end of rod 170 is secured to the usual pedal or lever associated with the parking brake of a vehicle. Actuation of such pedal or lever results in pulling of rod 170, with resultant braking action. Thus, the brake may be actuated as a regular service brake by the usual hydraulic means or as a parking brake by the manually operable mechanical means disclosed.

The brake can easily be converted into a safety brake by installing a spring housing and spring on flange 146 and reversing the direction of the ramps in the actuating plate 88. Hydraulic pressure acting against such a spring structure will maintain the brake disengaged and, in the absence of hydraulic pressure, the spring in the structure will actuate the brake, thus providing for safety in the event of failure of the hydraulic brake system.

Brake adjustment for wear may be accomplished by adjusting the clevis 154.

What we claim as our invention is:

1. A disc brake comprising a housing, a shaft journaled in said housing for rotation, a series of brake discs encircling said shaft in said housing having alternately arranged first and second brake discs, said first discs being keyed to said shaft for longitudinal movement and for rotation therewith, said second discs being non-rotatably keyed to said housing for longitudinal movement, an annular piston encircling said shaft and non-rotatably keyed to said housing at one side of said series of brake discs for longitudinal movement, an annular rotatable actuator encircling said shaft at the side of said piston opposite said series of brake discs, registering ramps on the opposing faces of said actuator and said piston, roller means engaging said registering ramps so that rotation of said actuator in one direction will shift said piston toward said series of brake discs and cause braking engagement of said discs, means for rotating said actuator in said one direction comprising a hydraulic assembly and a mechanical assembly, said housing having a first extension mounting said hydraulic assembly on one side thereof and a second extension mounting said mechanical assembly on the opposite side thereof, each assembly having a reciprocable operator, said actuator having radially outward projections on diametrically opposite sides thereof extending through said housing, and lost-motion pin and slot connections between operators and said respective projections, so that said actuator may be rotated in said one direction by either assembly through one of said lost-motion connections by movement of its operator in an operating direction, the pin of each lost-motion connection being at one end of its slot so as to transfer motion to said slot without lost motion when its operator moves in said operating direction and so as to move with lost motion in its slot when the other operator moves in said operating direction.

2. A disc brake comprising a housing, a shaft journaled in said housing for rotating, two axially spaced series of brake discs encircling said shaft in said housing, each series having alternately arranged first and second brake discs, said first discs being keyed to said shaft for longitudinal movement and for rotation therewith, said second discs being non-rotatably keyed to said housing for longitudinal movement, a pair of annular pistons encircling said shaft in the space between said two axially spaced series of discs and non-rotatably keyed to said housing for longitudinal movement, an annular, rotatable actuator encircling said shaft between said pistons, registering ramps on the opposing faces of said actuator and one piston, registering ramps on the opposing faces of said actuator and said other piston, roller means engaging said registering ramps so that rotation of said actuator in one direction will shift said pistons axially apart and cause braking engagement of the discs of both series, spring means normally urging said pistons toward one another, means for rotating said actuator in said one direction comprising a hydraulic assembly and a mechanical assembly, said housing having a first extension mounting said hydraulic assembly on one side thereof and a second extension mounting said mechanical assembly on the opposite side thereof, each assembly having a reciprocable operator, said actuator having radially outward projections on diametrically opposite sides thereof extending through said housing, and lost-motion pin and slot connections between said operators and said respective projections, so that said actuator may be rotated in said one direction by either assembly through one of said lost-motion connections by movement of its operator in an operating direction, the pin of each lost-motion connection being at one end of its slot so as to transfer motion to said slot without lost motion when its operator moves in said operating direction and so as to move with lost motion in its slot when the other operator moves in said operating direction.

3. A disc brake as defined in claim 2, including auxiliary housings sealed to opposite sides of said first-mentioned housing to provide extensions thereof, said projections and the pin and slot connections thereof with said operators extending into said auxiliary housings.

4. A disc brake as defined in claim 2, wherein said roller means are tapered rollers.

* * * * *